United States Patent [19]
Fischer et al.

[11] 4,207,864
[45] Jun. 17, 1980

[54] DAMPER

[75] Inventors: George A. Fischer, Boxford; Robert A. Walter, Concord; Albert S. Melilli, Winchester, all of Mass.

[73] Assignee: General Electric Company, Schenectady, N.Y.

[21] Appl. No.: 913,605

[22] Filed: Jun. 8, 1978

[51] Int. Cl.² .............................................. F23L 11/00
[52] U.S. Cl. .................................. 126/285 R; 98/110; 98/121 A; 137/601
[58] Field of Search ................ 137/601; 251/212, 305, 251/306; 126/285 R, 286; 98/110, 114, 121 A; 49/89–91; 62/62

[56] References Cited

U.S. PATENT DOCUMENTS

| | | | |
|---|---|---|---|
| 2,148,713 | 2/1939 | Roof | 126/285 R |
| 2,966,169 | 12/1960 | Reese | 137/375 |
| 3,007,673 | 11/1961 | Paxton et al. | 251/297 |
| 3,228,389 | 1/1966 | Lowe et al. | 126/285 A |
| 3,313,226 | 4/1967 | Johnson | 98/40 |
| 3,464,341 | 9/1969 | Dobrin | 98/110 |
| 3,525,327 | 8/1970 | Crudden | 126/285 R |
| 3,525,328 | 8/1970 | Crudden | 126/285 R |
| 3,547,152 | 12/1970 | Hess | 137/601 |
| 3,602,165 | 8/1971 | Huntington | 126/285 R |
| 3,698,429 | 10/1972 | Lowe et al. | 137/601 |
| 3,749,115 | 7/1973 | Raftis | 137/601 |
| 3,805,884 | 4/1974 | Burt et al. | 126/286 |
| 3,894,481 | 7/1975 | Alley | 98/121 A |
| 3,963,070 | 6/1976 | Alley et al. | 165/98 |
| 3,996,845 | 12/1976 | Harris | 98/114 |
| 4,022,246 | 5/1977 | Janse | 137/601 |
| 4,027,654 | 6/1977 | Kannapell | 126/285 R |
| 4,077,432 | 3/1978 | Herr | 137/601 |

FOREIGN PATENT DOCUMENTS 1470307  4/1977  United Kingdom .

Primary Examiner—Ronald C. Capossela
Attorney, Agent, or Firm—James W. Mitchell; John F. Ahern

[57] ABSTRACT

The field of this invention is fluid flow control through large conduits. In particular, this invention is contemplated for use in a combined cycle power plant wherein gas turbine exhaust gas is either sent through a heat recovery steam generator (HRSG) or diverted to the atmosphere. The invention is a damper and frame assembly believed to be well suited to the purpose of channeling the hot exhaust gas within the context of a combined cycle power plant either as an isolation damper to the HRSG or a bypass damper to the exhaust stack. One key consideration is the thermal relationship between the damper blade and its adjacent frame and provision is made to provide a damper blade that will not warp and a frame wherein thermal growth and distortion are limited.

8 Claims, 6 Drawing Figures

U.S. Patent Jun. 17, 1980 Sheet 1 of 2 4,207,864
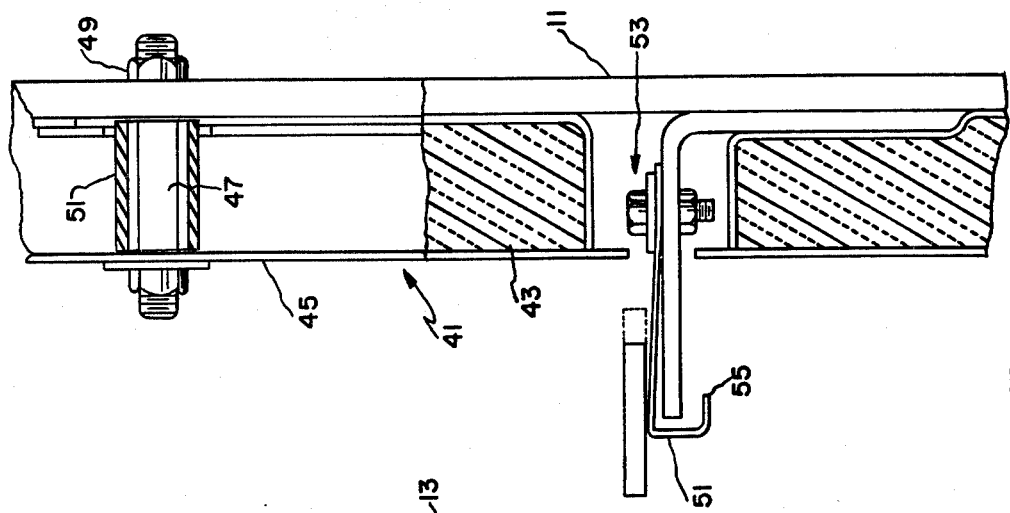
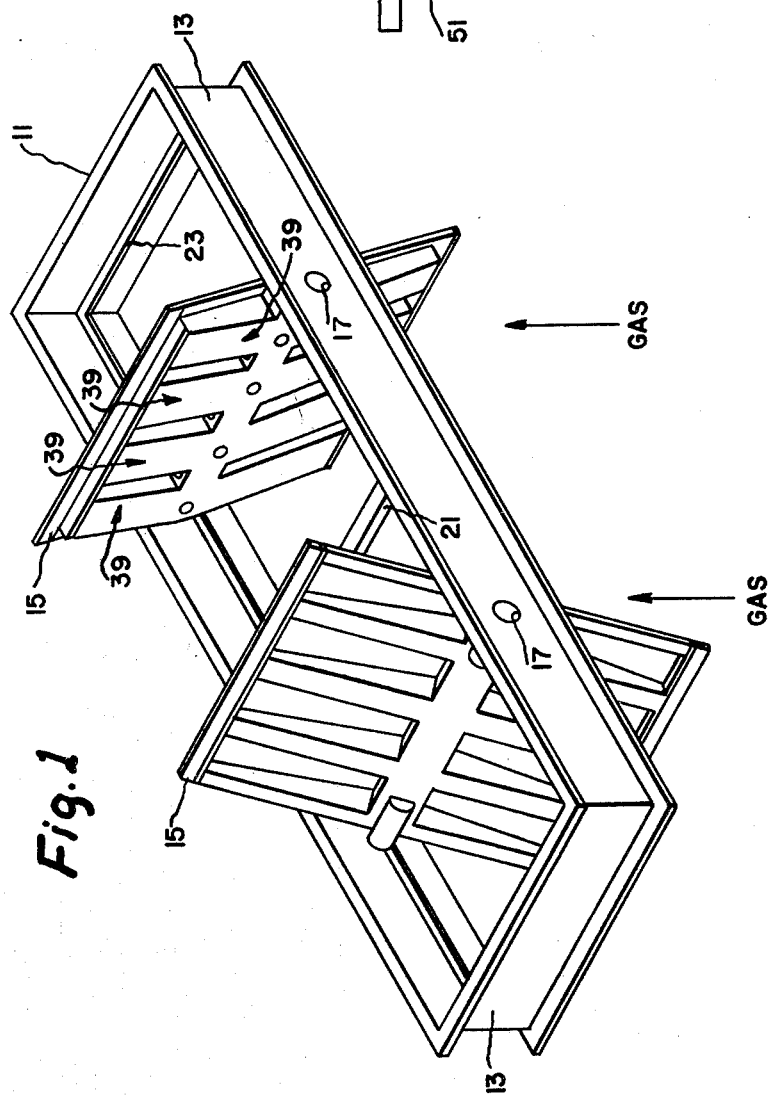

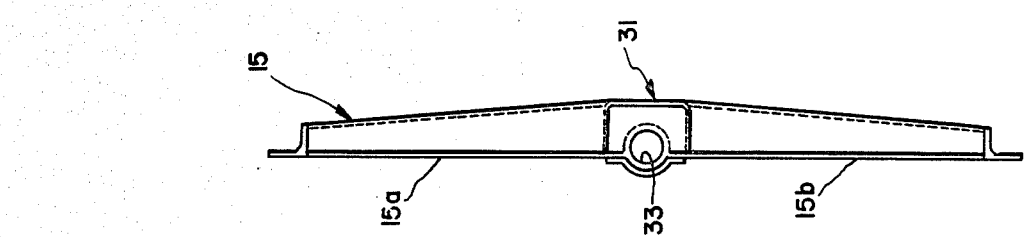
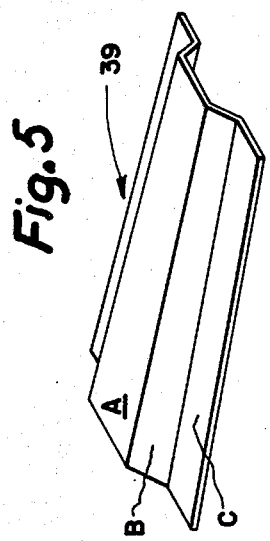
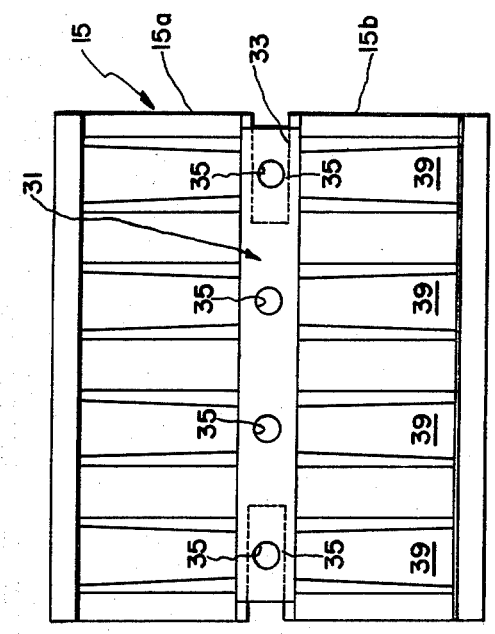
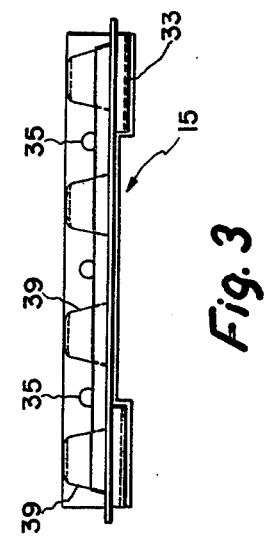

DAMPER

BACKGROUND OF THE INVENTION

This invention relates to the control of fluid flow through a conduit and, in particular, relates to the control of hot gas through a relatively large conduit.

A combined cycle power plant is one in which a gas turbine and a steam turbine are combined to produce electricity. The connecting link between the two is a heat recovery steam generator (HRSG) wherein there is a heat transfer relationship between the hot gas turbine exhaust gas and the steam turbine feedwater which is converted to steam. The exhaust end of the gas turbine is connected by a conduit with the HRSG and gas flow between the two is controlled by a so called isolation damper. There are times when it is desirable to isolate the HRSG from the hot exhaust gas and for this purpose there is provided a bypass stack which will exhaust the hot gas to the atmosphere. Gas flow through the bypass stack is controlled by a bypass damper. This arrangement is clearly shown in U.S. Pat. No. 3,934,553 for a "Combined Wall Burner and Flame Holder for HRSG" and assigned to the assignee of the present invention.

Two basic and related problems associated with HRSG dampers are addressed in this application. One problem is warping and other forms of thermal distortion which may be found in both the frame and damper blade. Another related and corollary problem is leakage through the damper. In the prior art it has been found necessary to reinforce damper blades with heavy rib struts to provide for stiffness of the blade. The damper blade is a relatively thin metal sheet whereas the ribs are relatively heavy leading to unequal relative thermal expansions. Another problem is that only one side of the damper blade is heated when the damper is closed. Unequal heating and unequal masses can result in thermal deformation and warp which substantially increases gas leakage and can lead to damper blade cracking so that replacement or repair is necessary.

The frame which contains the damper blade is also subject to thermal deformation which may cause the frame sides to bow inwardly resulting in an interference with the blade and/or cause the structure to fail at corner joints or to twist. Differential expansion between the frame and adjacent ductwork can lead to distress and leakage at the frame flanges.

In designing the damper structure for near zero flow; i.e., a complete blocking of flow when closed it is desirable to provide some margin for slight thermal deformation. This is provided in the present invention as will be more particularly pointed out in the following paragraphs.

BRIEF DESCRIPTION OF THE INVENTION

The invention is a damper blade and frame wherein the damper blade is rotatably secured within the frame. The damper blade is constructed of a central support member and two blade halves. The central support member is a box beam having a number of gas inlet and outlet ports included on its "hot" surfaces whereby the box beam is nearly equally heated throughout.

The blades are formed in two equal sections or blade halves. Each blade half is a fabricated single metal sheet having a plurality of substantially wedge-like sections formed therein. These wedge-like sections stiffen the blade without adding weight or thickness to the cross section of the material and hence thermal uniformity is maintained throughout.

In conjunction with the invention, the frame is fabricated with thermal insulation included on its interior surfaces. The thermal insulation comprises self-contained insulation packages including a stainless steel outer shell and insulation enclosed therein which is fastened to the interior surfaces of the frame. This insulates the frame from the hot exhaust gas and thereby minimizes thermal distortion. Finally, spring seals are provided so that any clearances caused by thermal distortion about the periphery of the damper blade are compensated for by spring seals which follow the movement of the damper blade.

OBJECTS OF THE INVENTION

It is one object of the present invention to provide a damper blade and frame having improved leakage control characteristics.

It is another object of the present invention to provide a damper blade which is less susceptible to thermal distortion and warping.

It is another object of the invention to provide a damper frame which is less susceptible to thermal distortion.

It is still another object of the present invention to provide improved sealing means in conjunction with the damper blade and the frame.

Other objects and advantages will become apparent from the following description of the invention and the novel features will be particularly pointed out hereinafter in the claims.

BRIEF DESCRIPTION OF THE DRAWINGS

FIG. 1 is an isometric drawing of a damper frame having two damper blades rotatably supported therein.

FIG. 2 is a plan view of a damper blade.

FIG. 3 is an elevation view of the damper blade.

FIG. 4 is a side elevation view of the damper blade.

FIG. 5 is an isometric view of a wedge section of the damper blade.

FIG. 6 is an enlarged detailed view of a portion of the frame including a sealing ledge, a spring seal, and insulation according to the present invention.

DETAILED DESCRIPTION OF THE INVENTION

The present invention is designed for but not limited to an application in combined cycle power plants. The invention will be found in the hot gas conduit interconnecting a gas turbine with the HRSG. Another and companion application for the invention would occur at the bypass duct. The respective location of these elements is illustrated in U.S. Pat. No. 3,934,553 assigned to the assignee of the present invention.

A frame 11 according to the present invention is comprised of a plurality of channel sections 13 which may be assembled together to form a rectangle. The frame is fairly massive and may have dimensions on the order of 24' by 12'. The frame may be inserted across the respective hot gas conduits for the purpose of controlling the flow of hot gas through the conduit. The frame may be built into the conduit or may be a free standing structure.

As shown in FIG. 1, there are two damper blades 15 rotatably mounted within the frame. While two damper blades are shown for purposes of illustration it is clear that one blade or more than two blades would fall within the scope of the present invention. Each blade may be mounted on a pair of stub shafts (not shown) which are extended into the frame through openings 17 in the frame. This obviously is not the only way of mounting the blades into the frame but it is believed to be one expedient method. The details of this construction are not shown since they are believed to be obvious to one of ordinary skill in the art and do not constitute a point of novelty.

Between each of the two blades there is a cross member 21 which serves to stiffen the frame while also providing a landing for the corresponding end of each damper blade. This scheme could be carried into any arrangement wherein there is more than one damper blade. In the instance where there is but one damper blade the cross member is not needed. As a preferred mode of operation, the blade open in opposed fashion giving a more uniform flow distribution than would be the case with parallel opening blades which force the gas flow to one side. In addition, the opposed opening blades give finer throttling control.

To complete the description of the frame member, there is also a sealing ledge 23 disposed on the interior surfaces of the frame. Referring briefly to FIG. 6, the sealing ledge may comprise an angle member which is attached to the frame and cross-member should there be a cross-member present. Further details of the sealing arrangement claimed as part of this invention will be disclosed in the following paragraphs.

Reference is now directed to FIGS. 2, 3 and 4 which show various views of the damper blade 15. The damper blade is comprised of a central support member 31 to which are attached to blade halves 15A and 15B. The central support member is a hollow box beam which further includes a pipe section 33 welded into each end. The pipe section is adapted to receive the stub shafts when the blade is assembled to the frame. The box beam is also formed with a plurality of gas ports 35 which admit gas to the inside of the box beam to minimize temperature differences throughout the blades. The gas ports are formed in the surfaces of the box beam which face the hot gas when the damper is closed. In addition, the outer surfaces of the box beam not facing the hot gas may be insulated to obtain still lower temperature differences in the box beam.

A key aspect to the present invention is the formation of each blade half. Each blade half is comprised of a continuous single thickness of metal sheet and includes a plurality of substantially wedge-like section 39 formed in the single sheet. The wedge-shaped sections provide stiffness to the damper blade without adding weight or thickness to the cross section. The resulting structure will be heated uniformly by the hot exhaust gas and thus minimize the occurrence of warping. Referring to FIG. 5, the manner in which each damper blade is formed with the wedge-like section is as follows. Each wedge section may be formed from plate stock of predetermined dimensions by bending the stock so as to form an inclined upper surface 39A and tapered sidewalls 39B which may be bowed slightly outwardly from top to bottom. Adjacent the sidewalls are flat sections 39C which interconnect the wedge sections. A plurality of wedge sections are then welded to each other and to the box beam. An angle member is welded to each blade half at the tip so that after assembly a continuous flat surface is formed about the periphery of the blade.

Referring now to FIG. 6 in more complete detail, insulation packages 41 are disposed adjacent the interior surfaces of the frame 11. These insulation packages include commercially available high temperature thermal insulation 43 in batt or block form which is protected by a stainless steel wrapper 45. These insulation packages are affixed to the interior surfaces of the frame by any convenient method as for example using bolts 47, nuts 49 and spacer pipes 51. A plurality of insulation packages may be used along the length of the frame sides so that spaces may be provided between the packages at convenient intervals to allow for thermal expansion.

Sealing means take the form of a sealing ledge 23 which extends inwardly from the interior surfaces of the frame to which a spring member may be affixed. In one preferred embodiment the sealing ledge comprises a structural angle having one leg extending inwardly towards its respective blade edge. The sealing means further includes a spring member 51 which is formed so as to bend around the sealing ledge. The spring member may be attached to the sealing ledge by a nut and bolt combination 53. The spring member 51 is formed so as to follow the blade tip. The free end of the blade tip is formed with a hook 55 which engages the sealing ledge when the blade is open. This allows the blade to warp slightly and move away from the sealing ledge a given amount without breaking contact between the seal and blade tip thereby resulting in leakage. When the blade 15 is drawn away from the spring member 51 as it is opened the hooked end 55 of the spring member 51 will engage the sealing ledge so as to prevent flutter of the spring member. The seal member and sealing ledge may be slotted or made in segments to allow for thermal expansion. This engagement also prevents debris from lodging under the spring member and impairing its action.

In summation the invention presents an improved damper and damper frame assembly having special application to hot gas control. The interior surfaces of the frame are insulated from the hot gases by means of insulation packages which are affixed to the interior surfaces. The blades themselves are formed from a box beam and blade half construction wherein the box beam provides a central support structure which is strong yet thermally compatible with each blade half. The box beam is hollow and includes a plurality of openings on the hot gas side so as to minimize thermal differences and bowing of the box beam. In addition the outer surfaces of the box beam not facing the hot gas may be insulated to obtain still lower temperature differences in the box beam. Each blade half is made by joining together a plurality of geometrically shaped sections. Each geometric section is formed from a single sheet of metal thereby providing stiffness to the blade without substantially affecting the thermal response of the cross section. The interior surface of the frame includes a sealing ledge which cooperates with the periphery of the damper blade to form a tight seal. In addition, spring members are used to further increase the effectiveness of the seal.

While there has been shown what is considered at present to be the preferred embodiments of the invention, other modifications may occur to those skilled in the art. Such modifications may include the use of more than two damper blades within a damper frame or the inclusion of spring members on the blade tip surfaces rather than on the sealing ledge surface. It is intended to cover, in the appended claims, all such modifications which fall within the true spirit and scope of the invention.

What is claimed is:

1. A damper device for alternatively blocking the flow of a gas through a duct comprising:
    a damper blade rotatably positioned across the duct, said damper blade including a central support member having attached thereto a pair of oppositely extending blade halves; each blade half being a continuous metal sheet having geometrically shaped corrugations formed therein;
    a plurality of gas ports formed in the gas exposed side of said central support member; and,
    an angle member attached at the free end of each blade half whereby a continuous flat sealing surface is formed at the end of each blade.

2. A damper device for alternatively blocking the flow of a hot gas through a large duct comprising:
    a damper frame adapted to be positioned across the duct;
    a damper blade rotatably mounted within said frame, said damper blade including a central support member having a pair of oppositely extending blade halves attached thereto; each blade half being a single metal sheet having wedge shaped corrugations formed therein;
    an angle member attached at the free end of each blade half whereby a continuous flat sealing surface is formed at the end of each blade; and,
    a sealing ledge positioned around the interior surfaces of said frame for engaging the perimeter of said damper blade when the damper blade is in the blocking position.

3. A damper device for alternatively blocking the flow of a hot gas through a duct comprising:
    a frame adapted to be positioned across the duct;
    a damper blade rotatably secured within said frame, said damper blade including a central support member and a pair of oppositely extending blade halves; each damper blade half being comprised of a continuous metal sheet having a plurality of substantially hollow wedge-like sections formed therein; and,
    a sealing ledge positioned around the interior surfaces of said frame for engaging the perimeter of said damper blade when the damper blade is in the blocking position.

4. The damper device recited in claim 2 wherein the damper frame is a rectangular structure comprising:
    a plurality of channel sections formed into a rectangle; and,
    heat insulation attached to the interior surfaces of said frame.

5. The damper device recited in claim 4 wherein the heat insulation comprises a plurality of separate spaced apart heat insulation packages attached to the interior surfaces of said frame each heat insulation package including:
    heat insulation filling; and,
    a stainless steel cover encapsulating the heat insulation filling.

6. The damper device recited in claim 2 further comprising:
    a spring seal attached to the sealing ledge and biased in the damper open direction.

7. The damper device recited in claim 4 further comprising:
    a hook end at the free end of said spring seal said hook end adapted to engage the sealing ledge when the damper blade is out of contact with the spring seal.

8. A damper device for alternatively blocking the flow of a hot gas through a duct comprising:
    a damper frame positioned in said duct and including a plurality of structural sections assembled together to form a rectangular support;
    heat insulation mounted on said damper frame to protect said damper frame from said hot gas;
    at least one damper blade rotatably mounted within said damper frame, said damper blade including a central support member having a pair of oppositely extending blade halves attached thereto; each blade half being a single metal sheet having geometrically shaped sections included therein;
    a plurality of gas ports formed in the central support member on the hot gas side of said damper blade; and,
    a sealing ledge positioned around the interior surfaces of said frame for engaging the perimeter of said damper blade when the damper blade is in the blocking position.

* * * * *